UNITED STATES PATENT OFFICE.

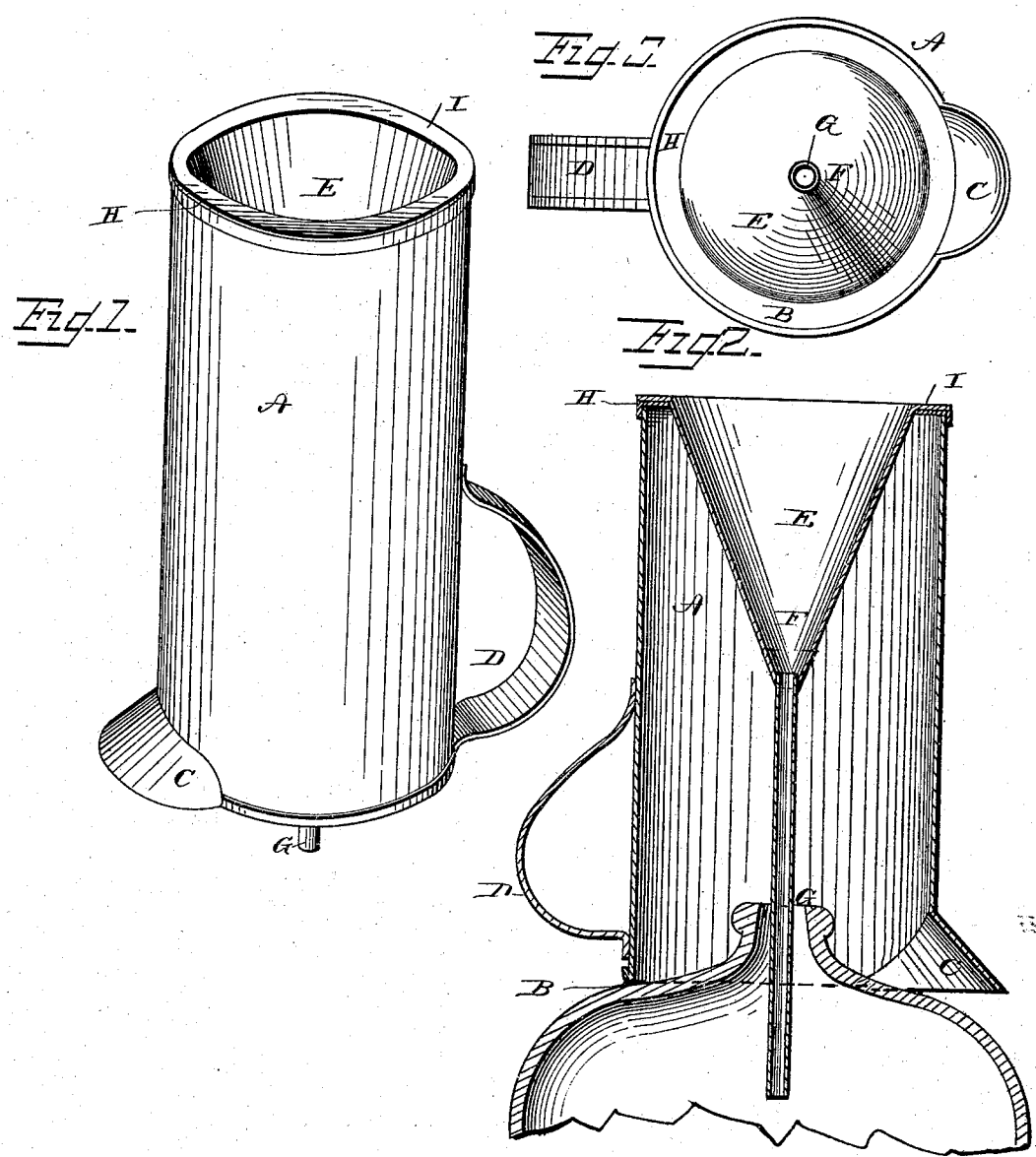

WILLIAM H. BENSON, OF STAUNTON, VIRGINIA.

CULINARY HEATER.

SPECIFICATION forming part of Letters Patent No. 271,774, dated February 6, 1883.

Application filed December 4, 1882. (No model.)

*To all whom it may concern:*

Be it known that I, WILLIAM H. BENSON, a citizen of the United States, residing at Staunton, in the county of Augusta and State of Virginia, have invented a new and useful Culinary Heater, of which the following is a specification, reference being had to the accompanying drawings.

This invention relates to culinary and other utensils and vessels for heating water, &c.; and it consists substantially in the combination of a cup and funnel, the parts being relatively arranged so that each can be used to perform its functions separately and independently.

In the drawings, Figure 1 is a perspective view of my combined cup and funnel, showing the mouth of the latter. Fig. 2 is a sectional view of the same, showing the position when used as a funnel. Fig. 3 is a view of the interior of the cup.

Referring to the drawings, A designates the cup, which has an open mouth, B, and is preferably provided with the lip C and handle D.

Inside the cup A is arranged the funnel E, the bottom of the former being formed by the conical portion F of the funnel E. The conducting-tube G of the funnel E extends through the cup from the conical portion F, and projects some distance from the plane of the edge of the mouth of the cup. Therefore when the cup is inverted, so that the funnel can be used, and rests on top of the vessel to be filled through the funnel, as shown in Fig. 2 of the drawings, this projecting end of tube G will enter and extend some distance down into the latter vessel, so that the contents are fed through the funnel without danger of waste, and with superior convenience and facility.

The funnel is preferably attached to the cup as follows: The latter is bottomless, and has an annular inwardly-extending flange, H, arranged around its bottom edge. The edge of the mouth of the conical portion F of the funnel is provided with an outwardly-extending annular flange, I, that is secured to flange H on its outside. These securing-flanges H I provide a double contact-edge when the cup is placed on the stove, and greater durability is thus secured.

My invention will be found useful and convenient in the household in many ways. It is specially useful for quickly and readily heating water over a small flame or lamp for use in shaving or other toilet operations, and by reason of the tube G projecting from the mouth of the cup any danger of the water flowing down the same into the lamp or fire is entirely obviated.

The advantages of my invention are obvious. It is simple, durable, inexpensive, convenient, and efficient.

I claim as my invention—

The combination, with the bottomless cup having an annular inwardly-projecting flange arranged at its bottom edge, of a funnel having an annular outwardly-projecting flange at the edge of its mouth, which latter flange is secured to the flange of the cup on the outside, the funnel being thus secured inside the cup and a double contact-edge provided, as set forth.

In testimony that I claim the foregoing as my own I have hereto affixed my signature in presence of two witnesses.

WILLIAM H. BENSON.

Witnesses:
C. K. ALLEN,
EDW. G. SIGGERS.